(12) United States Patent
Dumenil

(10) Patent No.: US 7,766,155 B2
(45) Date of Patent: Aug. 3, 2010

(54) TRANSFER DEVICE FOR TRANSFERRING AN ARTICLE IN A PRINTING MACHINE, A PRINTING MACHINE, AND A METHOD OF TRANSFER

(75) Inventor: François Dumenil, Chaumes En Brie (FR)

(73) Assignee: Machines Dubuit, Noisy-le-Grand (FR)

( * ) Notice: Subject to any disclaimer, the term of this patent is extended or adjusted under 35 U.S.C. 154(b) by 663 days.

(21) Appl. No.: 11/546,308

(22) Filed: Oct. 12, 2006

(65) Prior Publication Data

US 2007/0084361 A1    Apr. 19, 2007

(30) Foreign Application Priority Data

Oct. 12, 2005    (FR) .................................. 05 10421

(51) Int. Cl.
| | |
|---|---|
| B65G 25/00 | (2006.01) |
| B65G 29/00 | (2006.01) |
| B65G 49/06 | (2006.01) |
| B65G 47/24 | (2006.01) |
| B65B 47/00 | (2006.01) |
| B41F 17/00 | (2006.01) |

(52) U.S. Cl. .............................. 198/468.4; 198/468.01; 198/468.2; 198/429; 198/867.01

(58) Field of Classification Search ............ 198/468.01, 198/468.2, 468.6, 429, 867.01, 803.3

See application file for complete search history.

(56) References Cited

U.S. PATENT DOCUMENTS

| 4,164,279 | A | * | 8/1979 | Dubuit | .................... | 198/463.6 |
| 5,076,165 | A |   | 12/1991 | Pollich et al. | | |
| 6,213,011 | B1 | * | 4/2001 | Dubuit | ........................ | 101/35 |
| 7,121,198 | B2 | * | 10/2006 | Dumenil | ...................... | 101/35 |
| 7,261,033 | B2 | * | 8/2007 | Dubuit et al. | .............. | 101/40.1 |
| 2001/0046436 | A1 |   | 11/2001 | Mahoney | | |

FOREIGN PATENT DOCUMENTS

| EP | 1543965 | 6/2005 |
| FR | 1378101 | 11/1964 |
| FR | 2775471 | 9/1999 |

\* cited by examiner

*Primary Examiner*—Gene Crawford
*Assistant Examiner*—Yolanda Cumbess
(74) *Attorney, Agent, or Firm*—Young & Thompson

(57) ABSTRACT

The invention relates to a transfer device (15) for transferring an article (9) in a printing machine (2), the device comprising a hinged manipulator arm (20), a hinged gripper clamp (22), and drive means adapted to drive both the manipulator arm (20) and the gripper clamp (22) together in rotation. The drive means include synchronization means adapted to inhibit the rotary movement of the gripper clamp (22) relative to the rotary movement of the manipulator arm (20), temporarily as a function of the position of the manipulator arm (20). The invention also provides a printing machine (2) including such a transfer device (15), and to an associated method.

16 Claims, 9 Drawing Sheets

TRANSFER DEVICE FOR TRANSFERRING AN ARTICLE IN A PRINTING MACHINE, A PRINTING MACHINE, AND A METHOD OF TRANSFER

BACKGROUND OF THE INVENTION

The present invention relates to a transfer device for transferring an article in a printing machine, the device being of the type including: a support structure; a manipulator arm carried by the support structure and hinged relative to the support structure about a pivot axis; a clamp for gripping the article carried by the manipulator arm and hinged relative to the manipulator arm about a tilt axis that is angularly offset relative to the pivot axis; and drive means adapted to drive both the manipulator arm and the gripper clamp in rotation during an intermediate rotation stage.

Silkscreen printing machines are used for performing repetitive printing on identical articles presenting an axis of circular symmetry.

SUMMARY OF THE INVENTION

In such silkscreen printing machines, printing takes place in a printing station by rotating the articles about their axis of symmetry while simultaneously moving a screen in a plane tangential to the articles, with ink being transferred through the screen by the pressure of a squeegee against the screen, the screen then being pinched between the articles and the squeegee.

In the printing station, articles are held and driven in rotation by a retention and rotary drive assembly comprising a socket for receiving the bottom of the article and a plunger mounted to move axially relative to the socket and suitable for being inserted in the neck of the article.

Articles for printing are brought to the vicinity of the printing station by a feed conveyor, and are then transferred from said conveyor to the printing station by a transfer device. Another transfer device in a symmetrical disposition serves to transfer printed articles from the printing station to a removal conveyor.

On the feed and removal conveyors, the articles for printing are generally placed with an orientation that is different from that of the articles when in the printing station.

More precisely, when the articles for printing are bottles or flasks, they are stood vertically on the surface of the conveyor with their axes of symmetry extending perpendicularly to the surface of the conveyor. In contrast, in the printing station, the articles are disposed with their axes of symmetry extending generally horizontally, i.e. perpendicularly to the initial orientation of the articles on the conveyor.

The transfer device interposed between the feed conveyor and the printing station is suitable for moving articles in general from the outlet end of the conveyor to the retention and drive assembly while simultaneously titling the articles. Opposite movement is imparted by the other transfer device in order to transfer printed articles from the printing station to the removal conveyor.

Such a transfer device for loading and/or unloading articles relative to a printing station is described for example in patent document FR 2 775 471.

In that document, the transfer device is adapted to tilt each article all along the path it follows from the conveyor to the retention and drive assembly. Such a transfer device comprises an article gripper clamp constituted by two hinged jaws that pivot to open through an angle that is sufficient to enable the article to be gripped while ensuring that the periphery of the base of an article does not strike the surface of the article feed conveyor during the initial stage of the article being moved towards the printing station.

Nevertheless, such a device presents an article transfer rate that is low because of the time needed to open the jaws, which time is made necessary by the length of the angular stroke over which the hinged jaws move. Unfortunately, jaws of that type are made necessary by the small amount of space available for moving articles between the article feed conveyor and the articles placed thereon.

An object of the invention is to provide a transfer device presenting a faster transfer rate.

To this end, the invention provides a transfer device of the above-specified type, characterized in that the drive means comprise synchronization means suitable for inhibiting tilting of the gripper clamp relative to the manipulator arm about the tilt axis, temporarily as a function of the position of the manipulator arm during at least one terminal rotation stage before and/or after the intermediate rotation stage.

In particular embodiments, the transfer device includes one or more of the following characteristics:

the synchronization means are suitable for stopping the gripper clamp from tilting relative to the manipulator arm during at least one terminal rotation stage before and/or after the intermediate rotation stage;

the drive means comprise:
  a drive system for driving the manipulator arm and the gripper clamp;
  a drive system for driving the gripper clamp;
  a single drive motor for driving the drive system for the manipulator arm and the gripper clamp;
  a controllable mechanism for modifying the drive of the drive system for the gripper clamp; and
  means for mechanically coupling the drive motor to the controllable mechanism for modifying the drive of the gripper clamp;

the manipulator arm includes a shell, and the drive means include a first drive shaft carrying an angle transmission, and a second drive shaft co-operating with said angle transmission, which second drive shaft is fastened securely to the clamp;

a single drive motor suitable for driving both the shell to cause the manipulator arm to pivot about the pivot axis, and the first drive shaft to cause the gripper clamp to tilt about the tilt axis;

the drive means are carried by the support structure, and said single drive motor is adapted to drive the manipulator arm and the gripper clamp during the intermediate rotation stage, and to drive only the manipulator arm during the or each terminal rotation stage;

the drive means comprise first transmission means for transmitting pivoting movement of the manipulator arm relative to the support structure, and second transmission means for transmitting tilting movement of the gripper clamp relative to the manipulator arm, the second transmission means co-operating with the synchronization means;

the first transmission means comprise a drive disk secured to a drive shaft adapted to turn the drive disk, a pivot wheel secured to the drive disk, a crank secured to the manipulator arm and provided with a guide slot extending radially relative to the pivot axis, the guide slot being adapted to co-operate with the pivot wheel to turn the manipulator arm during the terminal rotation stages and during the intermediate rotation stage;

the second transmission means include an angle transmission disposed in the manipulator arm having one end carrying the gripper clamp and having its other end connected to the synchronization means for driving the angle transmission in order to turn the gripper clamp during the terminal rotation stages and the intermediate rotation stage;

the synchronization means include a cam path formed in the drive disk, the cam path including at least one end portion presenting a shape adapted to cause the angle transmission to turn relative to the manipulator arm, and the synchronization means include a drive carriage supporting a control wheel slidably received in the or each middle portion to drive the carriage in translation relative to the support structure and to prevent the gripper clamp from turning relative to the manipulator arm during the terminal rotation stage;

the cam path includes at least one middle portion presenting a shape adapted to drive the carriage in translation relative to the support structure and to turn the gripper clamp relative to the manipulator arm during the intermediate rotation stage;

the gripper clamp comprises a support element, two jaws mounted on the support element and movable in translation along an axis perpendicular to the tilt axis, and means for moving the jaws in translation in order to take hold of and/or to release the article; and the gripper clamp further includes at least two indentations each presenting a specific profile adapted to co-operate with the particular shape of an article and formed in pieces having means for being secured to the jaws.

The invention also provides a printing machine comprising a frame and an above-mentioned transfer device carried by the frame, the machine being characterized in that the support structure is mounted to move relative to the frame, and in that the drive means are also adapted to move the support structure relative to the frame in an axial direction relative to the pivot axis during a stage of movement in translation In particular embodiments, the printing machine includes one or more of the following characteristics:

it includes a transfer device of the above-specified type, and it further includes at least one guide cylinder secured to the frame and provided with a guide shoe, and the drive means of the transfer device include third transmission means for transmitting movement in translation of the support structure relative to the frame, the third transmission means including a groove formed in the edge face of the drive disk and provided with at least a first segment extending axially relative to the drive shaft, the guide shoe being adapted to engage in the first segment of the groove to move the support structure relative to the frame in translation parallel to the pivot axis during the stage of movement in translation; and the groove includes a second segment that is circular and concentric with the drive shaft, and the guide shoe is adapted to engage in the second segment of the groove during the terminal rotation stage and the intermediate rotation stage to allow the support structure to be held in position while allowing the manipulator arm to move in rotation.

The invention also provides a method of transferring an article between first and second locations in a printing machine as mentioned above, the method comprising the following steps:

at least one terminal rotation stage during which the manipulator arm is driven in rotation about the pivot axis while the gripper clamp is stationary relative to the tilt axis;

an intermediate rotation stage during which the manipulator arm is driven in rotation about the pivot axis and the gripper clamp is driven in rotation about the tilt axis; and a stage of movement in translation during which the support structure is moved towards and away from the frame in translation parallel to the pivot axis, the manipulator arm is stationary relative to the pivot axis, and the gripper clamp is stationary relative to the tilt axis.

In a particular implementation, the method includes a stage of moving the jaws during which the jaws are moved in translation to take hold of or to release the article, and during which the manipulator arm is stationary relative to the pivot axis and the gripper clamp is stationary relative to the tilt axis.

BRIEF DESCRIPTION OF THE DRAWINGS

The invention can be better understood on reading the following description given purely by way of example and made with reference to the drawings, in which.

DETAILED DESCRIPTION OF THE INVENTION

Figure 1:
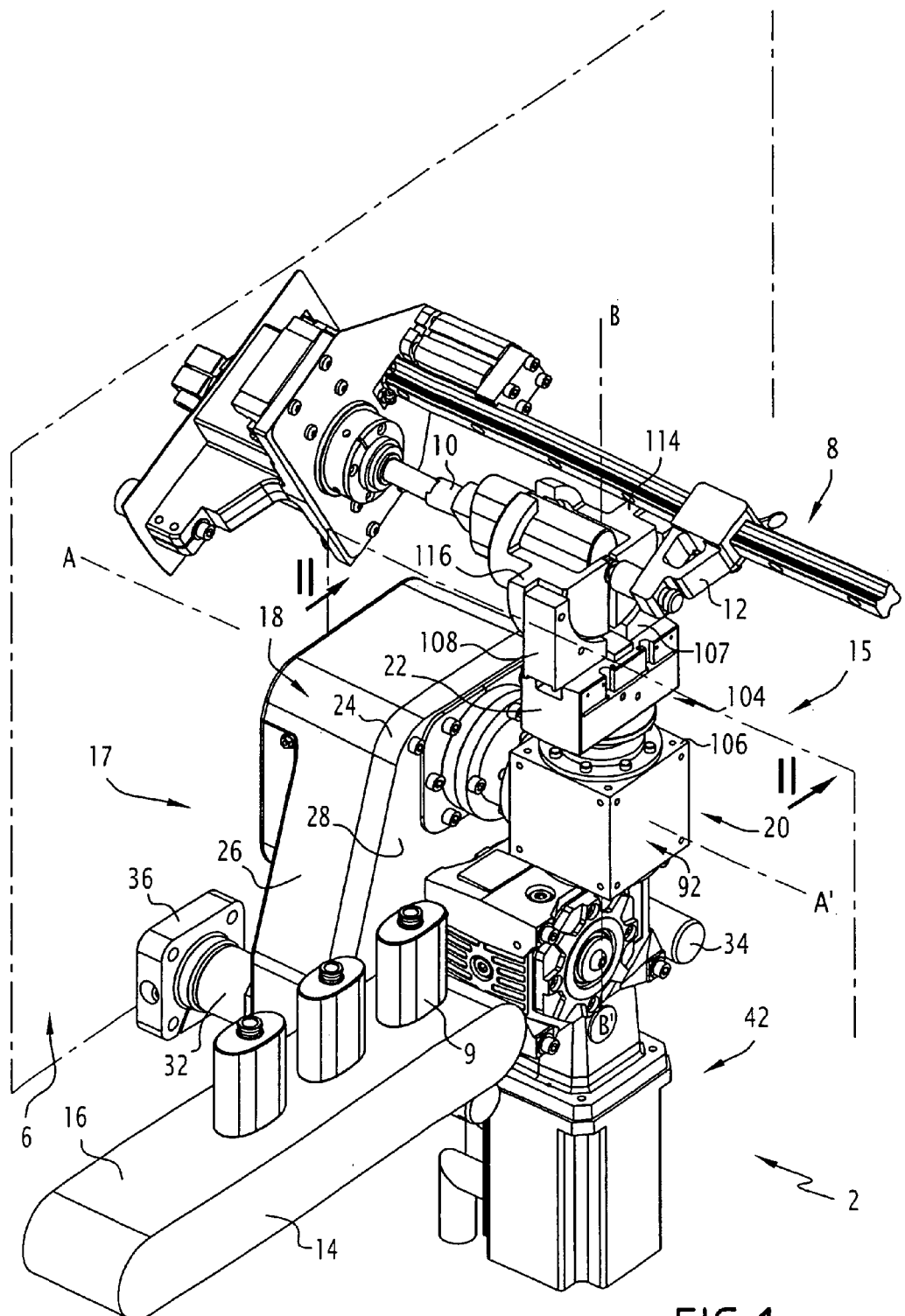
FIG. 1 is a perspective view of a portion of a printing machine of the invention and including a transfer device, also of the invention.

The printing machine 2 of the invention includes a frame 4 represented solely by a portion of its front face 6 in FIG. 1, a retention and rotary drive assembly 8 secured to the frame 4, and a printing station (not shown) mounted on the frame 4 facing the retention and drive assembly 8.

In the description below, orientations such as "up", "down", "front", and "rear" correspond to the orientation of the printing machine 2.

The retention and drive assembly 8 includes a socket 10 defining a recess of shape complementary to the shape of the bottom of an article 9 that is to receive printing, and a plunger 12 for retaining the neck of the article, placed facing the socket 10. This plunger 12 is slidably movable towards and away from the front face 6 of the frame in order to hold the article 9 axially between the socket and the plunger. The socket 10 is driven axially in rotation while the article is being printed. Unlike the plunger, the socket 10 is stationary in translation in a direction perpendicular to the front face 6 of the frame.

The printing machine 2 further includes a feed conveyor 14 for feeding articles 9 to be printed, and a transfer device 15 carried by the frame 4 and adapted to move the articles 9 for printing from the feed conveyor 14 to the retention and drive assembly 8. It further includes, symmetrically relative to a vertical midplane of the printing machine 2, a conveyor (not shown in FIG. 1) for removing printed articles, and a transfer device (not shown in FIG. 1) for unloading printed articles from the retention and drive assembly 8 to the removal conveyor.

The feed conveyor 14 includes a conveyor belt 16 closed in a loop and held between two parallel belt-deflecting cylinders, one of which is motor-driven. On this conveyor, articles 9 for printing are disposed in succession and in alignment with their axes of symmetry extending vertically, perpendicularly to the conveyor belt 16.

On the retention and drive assembly 8, the articles 9 for printing are disposed with their axis of symmetry extending horizontally. The socket 10 is positioned in a vertical plane that is closer to the front face 6 of the frame than is the vertical plane containing the conveyor 14.

Figure 2:
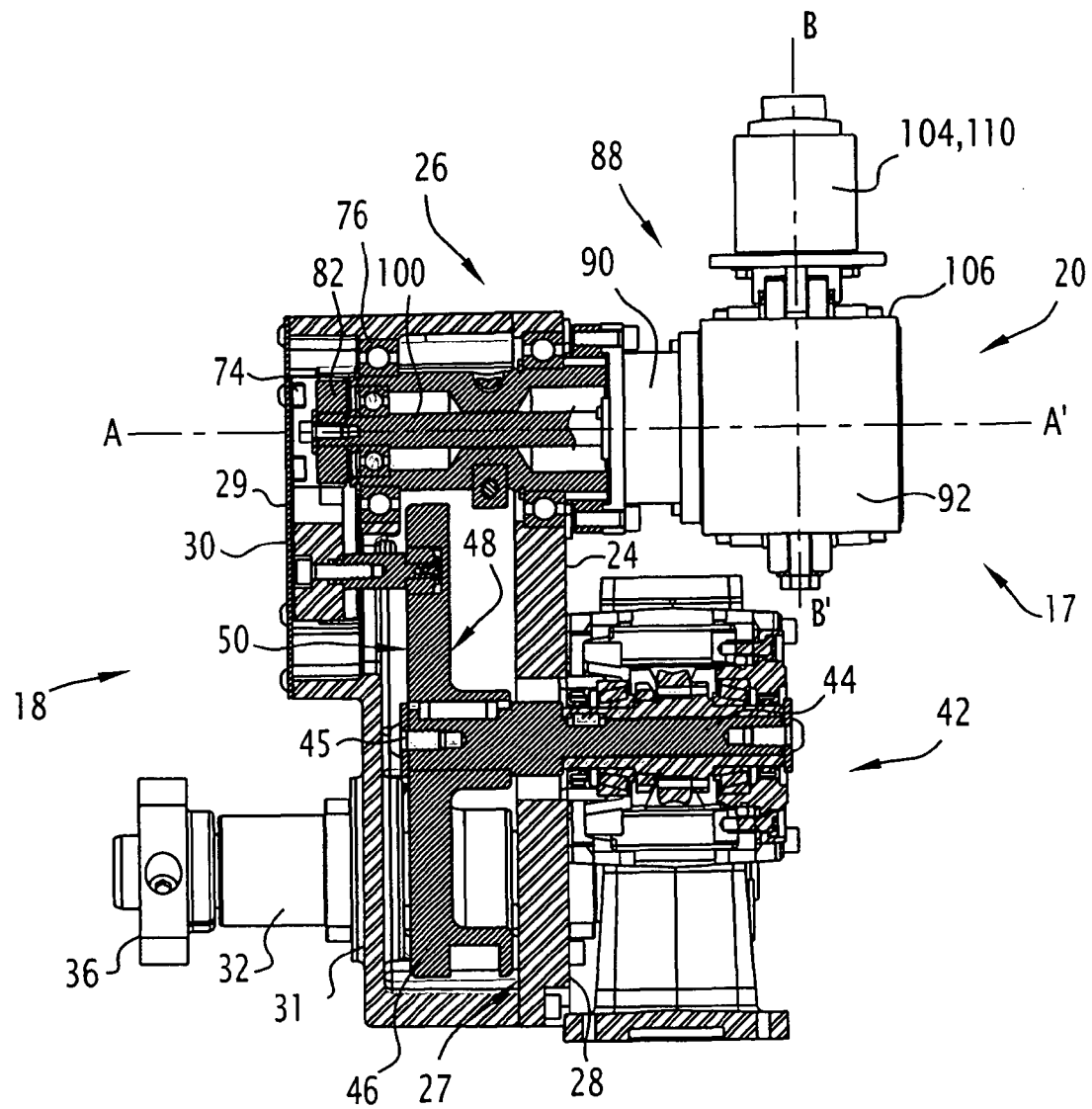
FIG. 2 is a section view of the transfer device on plane II-II of FIG. 1.

The transfer device 15, shown in FIGS. 1 and 2, includes moving equipment 17 mounted to move in translation in a direction perpendicular to the front face 6 of the frame.

The moving equipment 17 comprises a support structure 18 carrying a manipulator arm 20 hinged about a pivot axis A-A' perpendicular to the front face 6 of the frame, and fitted at its end with a gripper clamp 22 hinged about a tilt axis B-B' extending perpendicularly to the axis A-A'.

The moving equipment 17 further comprises drive means 23 for driving the clamp relative to the frame 4.

The support structure 18 is formed by a support plate 24 extending in a plane parallel to the front face 6 of the frame, and a box 26 for protecting a portion of the mechanism for driving the transfer device 15.

The support plate 24 has a rear face 27 facing the front face 6 of the frame, and a front face 28, opposite from the rear face 27. The box 26 is secured to the rear face 27 of the support plate. An opening 29 formed in the rear face of the box 26 gives access to the components of the drive mechanism. This opening 29 is closed by a cover 30.

The support structure 18 is mounted to move in translation in a direction perpendicular to the front face 6 of the frame. For this purpose, the structure 18 includes bearings 31 in its bottom portion, which bearings have two support cylinders 32, 34 passing therethrough. The support cylinders 32, 34 are engaged in the bearings to carry the moving equipment 17 while allowing it to slide along the cylinders.

The support cylinders 32, 34 are secured to the front face 6 of the frame via retaining blocks 36, 38. The blocks 36, 38 support the cylinders 32, 34 so that their axes extend perpendicularly to the front face 6 of the frame. A guide shoe 40 is secured to the top peripheral face of the support cylinder 32.

A motor and gearbox unit 42 is mounted in a casing on the front face 28 of the support face. A drive shaft 44 from the motor and gearbox unit 42 passes through a bore formed in the intermediate and central portion of the support plate 24. Its end is secured to the center 45 of a drive disk 46 arranged in the box 26.

Figure 3:
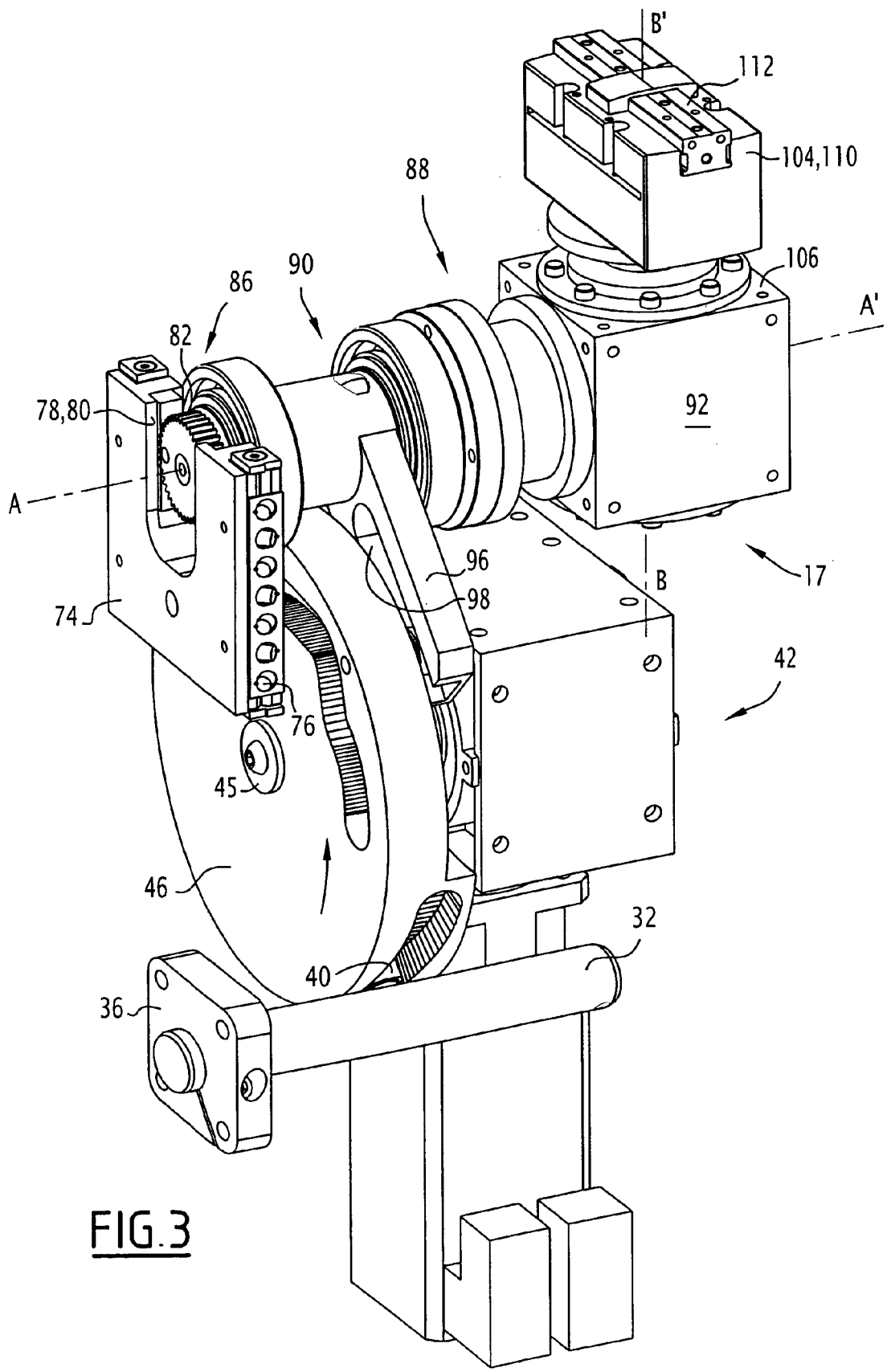
FIG. 3 is a perspective view of a portion of the drive means for a manipulator arm of the transfer device shown in FIG. 1.
Figure 4:
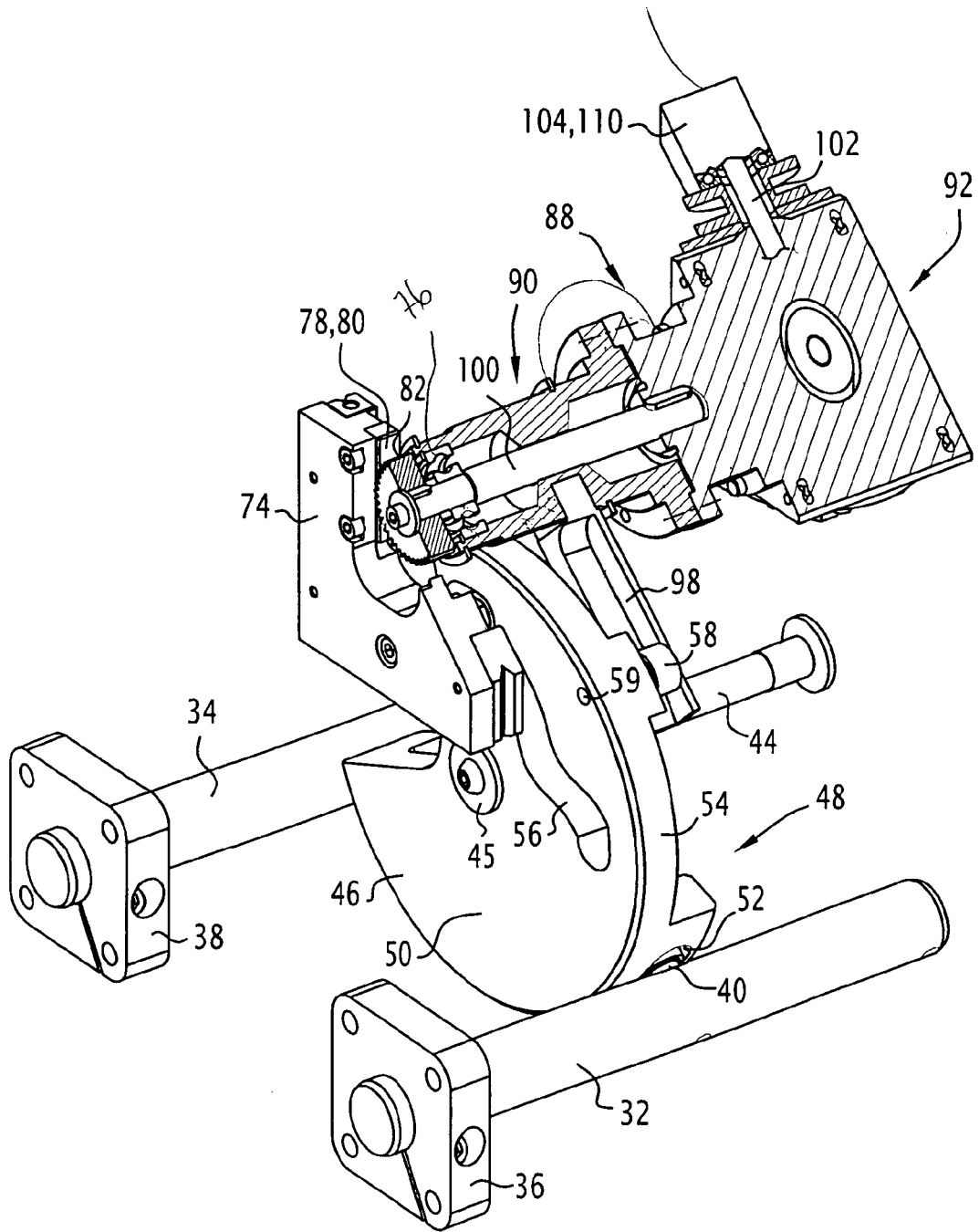
FIG. 4 is a perspective view, partially in section, showing a portion of the means for driving the manipulator arm of the transfer device shown in FIG. 1.
Figure 5:
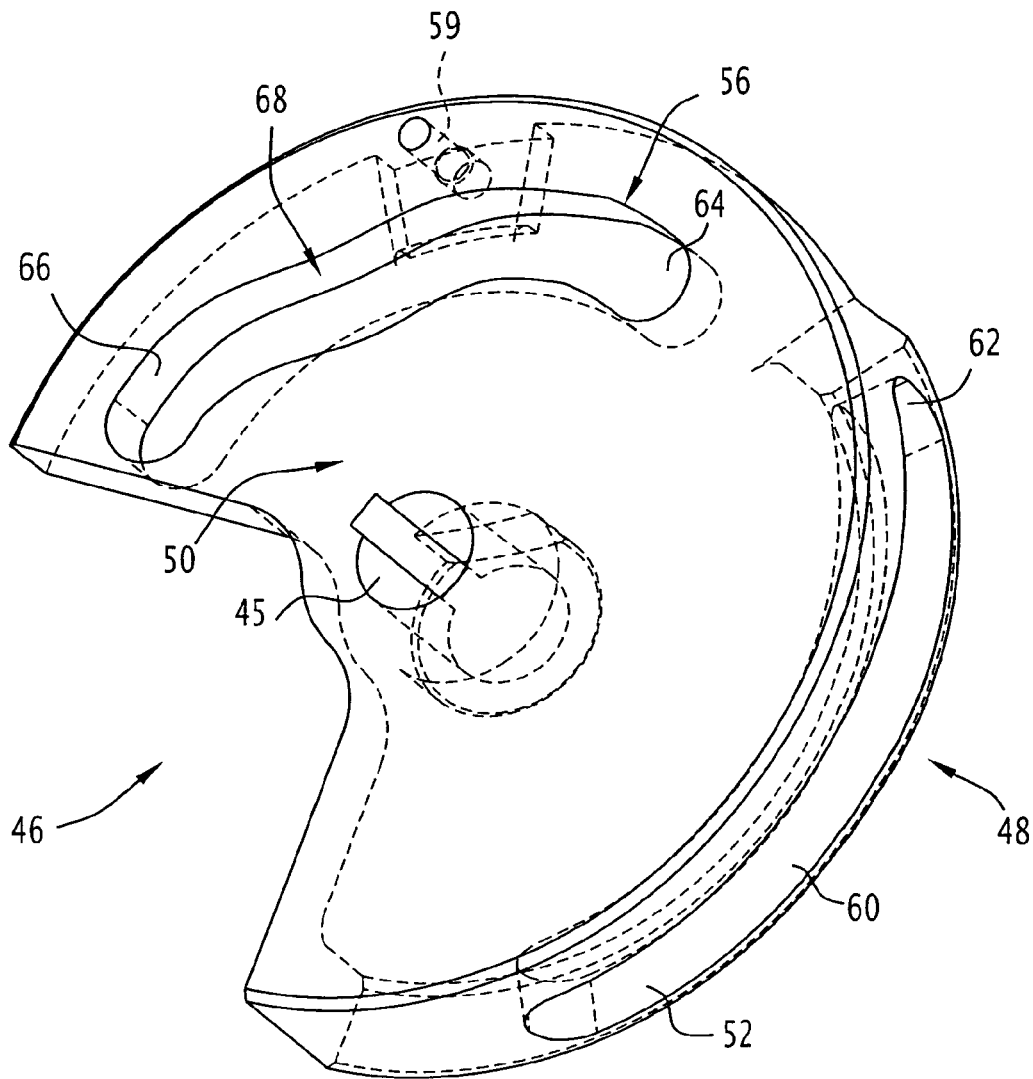
FIG. 5 is a perspective view of a drive disk of the transfer device shown in FIG. 1.

The drive disk 46, shown in FIGS. 3, 4, and 5, presents a front face 48 placed facing the rear face 27 of the support plate, and a rear face 50 opposite from its front face 48. It includes a groove 52 formed in its edge face 54 and a cam path 56 arranged in its rear face 50 towards the margin of the disk. A rotary pivot wheel 58 is mounted on the front face 48 close to the margin of the disk. The axis 59 of the wheel is parallel to the axis of the disk.

In the cylindrical edge face of the disk, the groove 52 presents an L-shaped profile. The longer branch 60 extends concentrically about the center 45 of the disk in a plane perpendicular to the axis of the disk, and the shorter branch 62 departs from this plane towards the front face 48 of the disk.

The guide shoe 40 secured to the support cylinder 32 is engaged in the groove 52 to constitute a fixed point enabling the moving equipment 17 to move relative to the support cylinders 32, 34 under drive from rotation of the disk 46.

The cam path 56 has two opposite end segments 64, 66 of non-circular shape disposed generally concentrically about the center 45 of the disk but at slightly different radii, and a central segment 68 of substantially concave shape and of curvature that is opposite to the curvature of the end segments 64 and 66.

The shape of the end segments 64, 66 is such that it compensates for the relative movement between the clamp 22 and the arm 20 so that the clamp 22 remains stationary relative to the arm while the arm is being rotated about the axis B-B' during an initial terminal rotation stage 70, and during a final terminal rotation stage 71, as explained below.

The shape of the central segment 68 is such that the clamp 22 tilts around the arm 20 through an angle of 90° during an intermediate rotation stage 72 over a stroke of the arm that extends angularly along a circular arc of less than 90°.

A drive carriage 74 is mounted to move vertically in translation relative to the box 26 facing and in a top portion of the rear face 50 of the disk. Rollers 76 are interposed between the flanks of the carriage 74 and the side walls of the box 26 to allow the carriage to move in translation.

Figure 6:
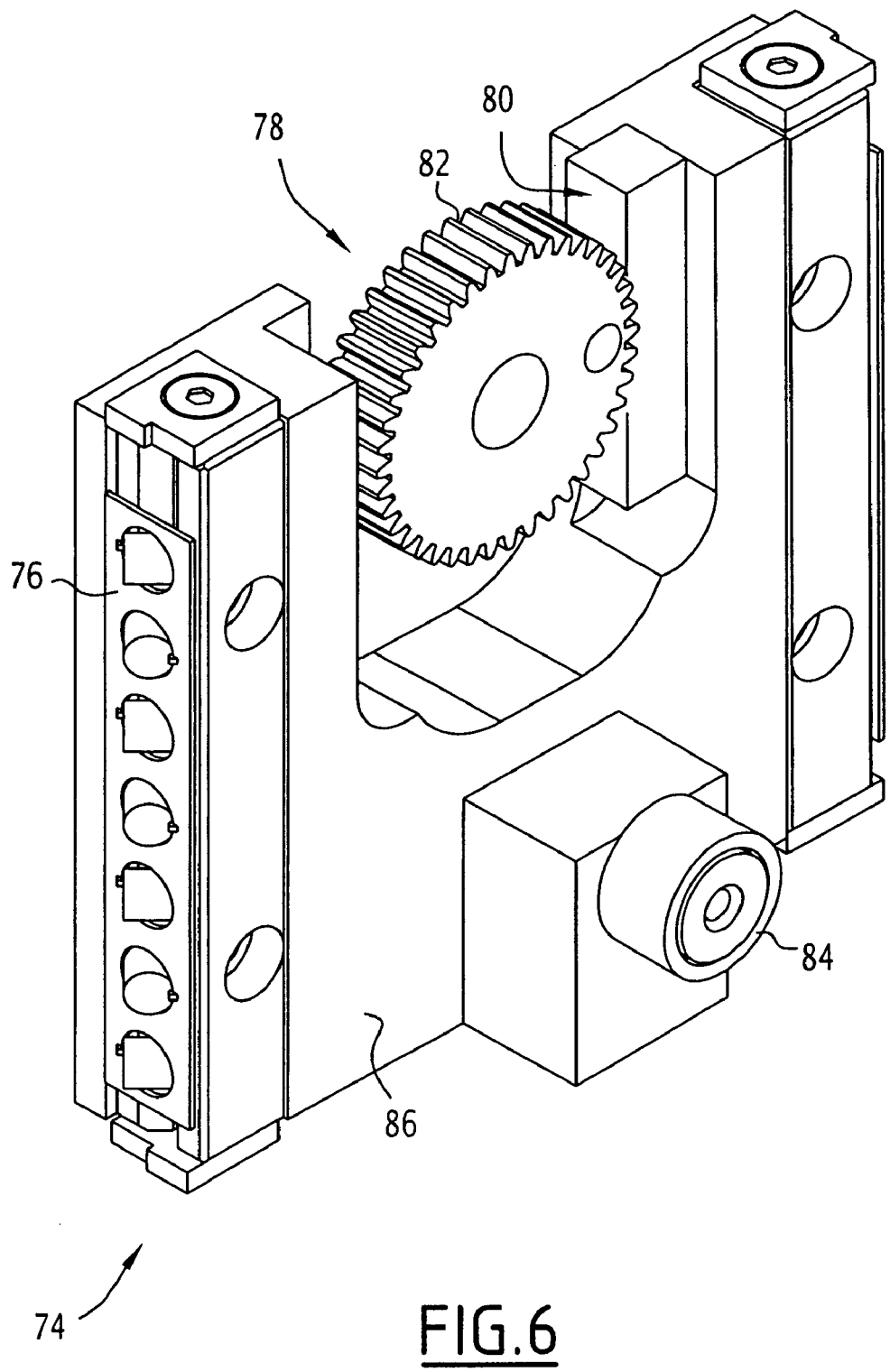
FIG. 6 is a perspective view of a drive carriage of the transfer device shown in FIG. 1.

As can be seen in FIG. 6, the carriage 74 is generally in the form of a rectangular parallelepiped having a U-shaped opening 78 at its top end. A vertical inside edge 80 of the opening 78 carries a rack (not shown in the figures). A driving pinion 82 housed in the box 26 meshes with the rack.

The carriage 74 is provided with a control wheel 84 positioned on its front face 86 near the bottom of the carriage and facing the rear face 50 of the disk. This wheel 84 is received in the cam path 56 and co-operates with the flanks thereof.

The manipulator arm 20 comprises a shell 88 carrying the clamp 22. The shell 88 is constituted by a drive sheath 90 carried by the plate 24 and containing an angle transmission 92.

The sheath 90 is mounted on the plate 24 to be free to rotate about its own axis, by means of bearings. The axis of the sheath 90 extends perpendicularly to the plate 24 and coincides with the pivot axis A-A' of the arm 20. Another end of the sheath 90 is secured to the angle transmission 92.

The sheath 90 is secured to a radial crank 96 (visible in FIGS. 3 and 4) having a rectilinear slot 98 formed therein. The slot 98 extends radially relative to the pivot axis A-A' of the sheath 90. The pivot wheel 58 carried by the disk 46 is engaged in the slot 98.

The angle transmission 92 comprises a first shaft 100 for driving the clamp that is mounted free to rotate inside the sheath 90. One end of this shaft 100 is secured to the drive pinion 82. The other end of this shaft 100 carries a bevel gear of the angle transmission that co-operates with a complementary bevel gear carried by a second drive shaft 102 of the angle transmission.

The clamp 22 includes a support 104 mounted to rotate by means of bearings about the axis B-B' on an outer peripheral surface 106 of the shell 88.

The support 104 is firmly secured to the second drive shaft 102 for driving the clamp. It carries two jaws 107, 108 placed facing each other so as to form a gripper, and a mechanism 110 for actuating the jaws 107, 108.

The mechanism 110 for actuating the jaws has rectilinear slideways 112 in alignment mounted at the distal end of the support 104 perpendicularly to the axis B-B', and pneumatic actuators for driving the two jaws 107, 108. The actuators are suitable for moving the two jaws 107, 108 apart and towards each other along the slideways 112 in translation on either side of the axis B-B' in order to release, to grip, and to hold an article 9 between them.

Each jaw 107, 108 has an indentation 114, 116 in its face that faces the other jaw, the profile of the indentations corresponding to the shape of an article 9 for printing. For each transfer device 15 there are provided a plurality of different indentations 114, 116 corresponding to different possible shapes of article for printing. These indentations 114, 116 are provided in pieces adapted to be secured to the jaws 107, 108.

The operation of the transfer device 15 is described below with reference to FIGS. 7 to 9. The transfer device takes an article 9 for printing standing on the feed conveyor 14 and moves it so as to place it in the socket 10 of the retention and drive assembly 8.

Initially, the gripper clamp 22 is disposed facing the feed conveyor 14. The jaws 107, 108 surround the article 9 for printing.

During a stage 120 of moving the jaws 107, 108, the mechanism 110 actuates the jaws 107 and 108 along the slideways 112 so that they move towards each other and take hold of an article 9 situated on the conveyor 14. During this stage, the motor and gearbox unit 42 does not turn the drive disk 46. The moving equipment 17, the arm 20, and the clamp 22 are stationary.

Figure 7:
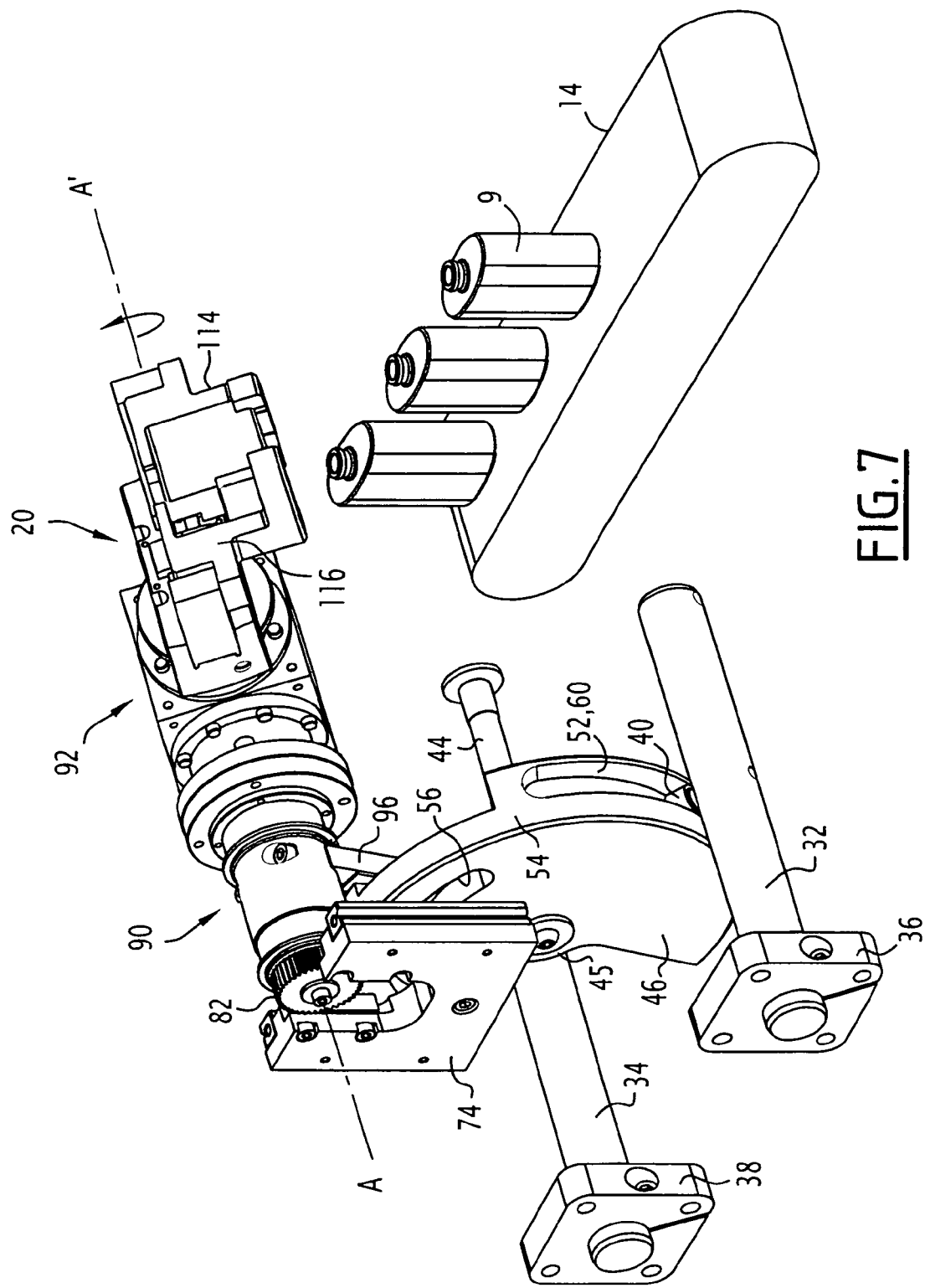
FIG. 7 is a perspective view of the transfer device shown in FIG. 1, in a position during an initial terminal rotation stage of the manipulator arm over an article feed conveyor.

Once the article 9 is held between the jaws 107 and 108, the manipulator arm 20 pivots solely about the pivot axis A-A' during an initial terminal rotation stage 70, as shown in FIG. 7.

For this purpose, the motor and gearbox unit 42 turns the drive shaft 44 which drives the drive disk 46. The pivot wheel 58 situated on the disk 46 is guided in the slot 98 and turns the crank 96 together with the shell 88 so that the arm 20 and the clamp 22 turn together about the axis A-A'.

In parallel, during the initial terminal rotation stage 70, the control wheel 84 of the carriage 74 is guided along the first end segment 64.

Since the segment 64 is not exactly circular and since its shape is designed to ensure that the clamp 22 remains stationary relative to the arm 20, the carriage 74 moves in slow upward vertical translation relative to the box 26 over a short stroke such that the pinion 82 and the shaft 100 pivot just enough to compensate for the relative movement between the clamp 22 and the arm 20.

More precisely, when the carriage 74 moves vertically, the rack 80 meshes with the pinion 82, thereby turning it. The angular movement of the pinion 82 is transmitted to the support 104 by the clamp via the first drive shaft 100, the angle transmission 92, and the second drive shaft 102.

Consequently, the arm 20 and the clamp 22 pivot about the axis A-A', and the clamp 22 is held in a position that is stationary relative to the arm about the axis B-B'.

Similarly, during the initial terminal rotation stage 70, the guide shoe 40 is guided in the branch 60 of the groove in the drive disk. Since the branch 60 is concentric about the center 45 of the disk, the moving equipment 17 remains stationary relative to the frame 4 of the printing machine.

Figure 8:
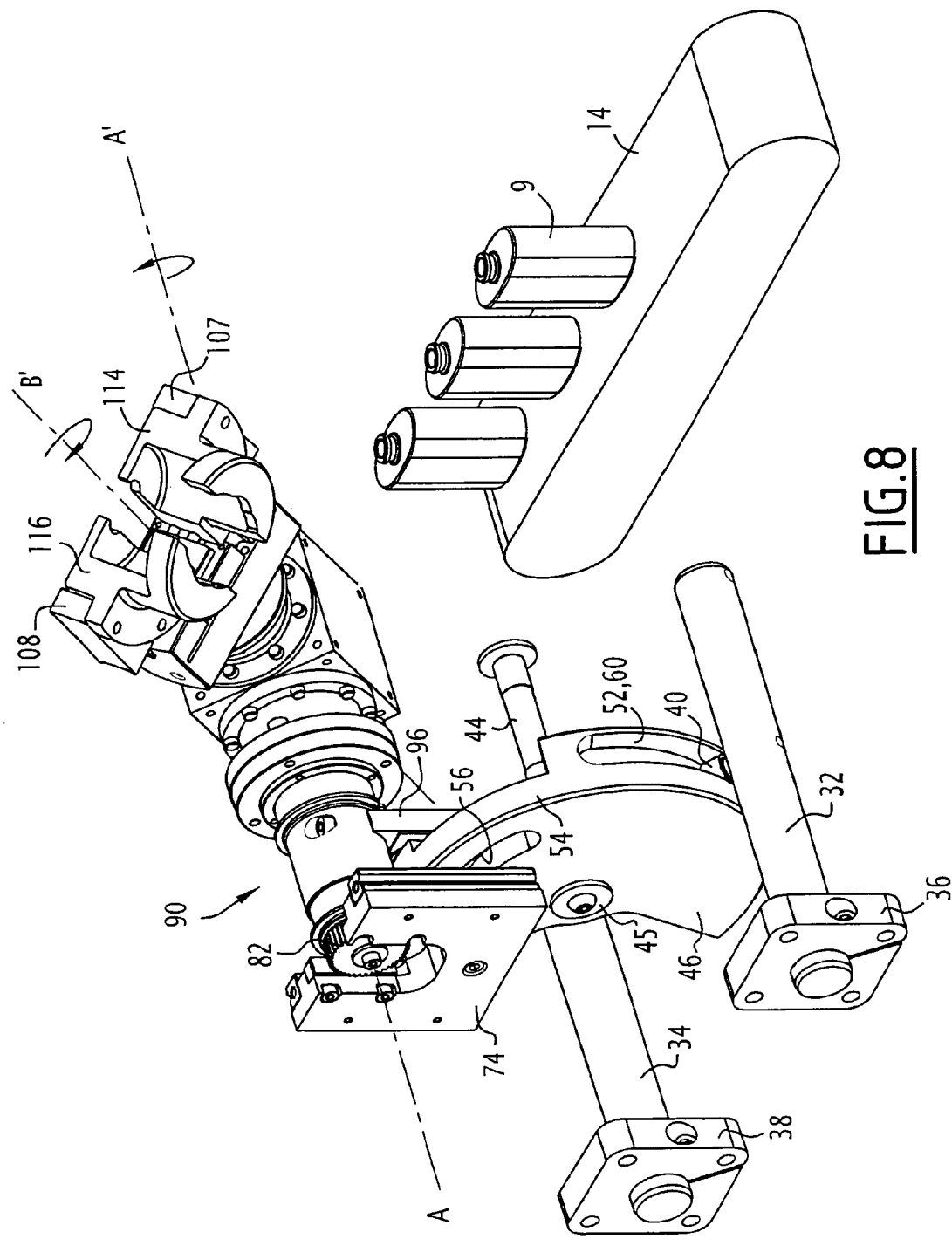
FIG. 8 is a view similar to the view of FIG. 7 in an intermediate rotation stage of a gripper clamp and of the manipulator arm.

Thereafter, during an intermediate rotation stage 72, shown in FIG. 8, the manipulator arm 20 continues to turn about the pivot axis A-A' and only then is the gripper clamp 22 driven about the tilt axis B-B' simultaneously with the rotary movement of the arm 20.

For this purpose, the motor and gearbox unit 42 continues to drive the drive shaft 44 and the drive disk 46.

The pivot wheel 58, guided in the slot 98 continues to drive the crank 96 and the shell 88. Consequently, the shaft 102 of the angle transmission 92 turns relative to the shell 88 as does the clamp 22 secured to the shaft 102, generally through an angle of 90° about its axis of rotation B-B'.

In parallel, the carriage 74 moves back to its initial position because of the shape of the segment 98 guiding the wheel 84 into a radial position that is identical to the radial position it had at the beginning of the cycle.

The jaws 107 and 108 secured to the support 104 and holding the article cause the article to pivot about the tilt axis B-B' so that the article 9 tilts through an angle of 90° about the tilt axis B-B' during the intermediate rotation stage 72.

In parallel, while the intermediate rotation stage 72 is taking place, the shoe 40 is also guided in the branch 60 of the groove 52 so that the moving equipment 17 is stationary relative to the frame.

The intermediate rotation stage 72 is followed by a final terminal rotation stage 71 during which the gripper clamp 22 remains stationary relative to the axis B-B' because of the action of the carriage 74 controlled by the wheel 84 cooperating with the profile 66 of the drive disk 46 and during which the manipulator arm 20 finishes rotating about the pivot axis A-A' so as to follow a total angular stroke of 90°.

Consequently, the manipulator arm 20 pivots through a total angle of 90° about the pivot angle A-A' during the three rotation stages, the intermediate stage 72, the initial terminal stage 70, and the final terminal stage 71, while the clamp 22 also pivots overall through 90° about its axis B-B', but solely during the intermediate rotation stage 72.

Figure 9:
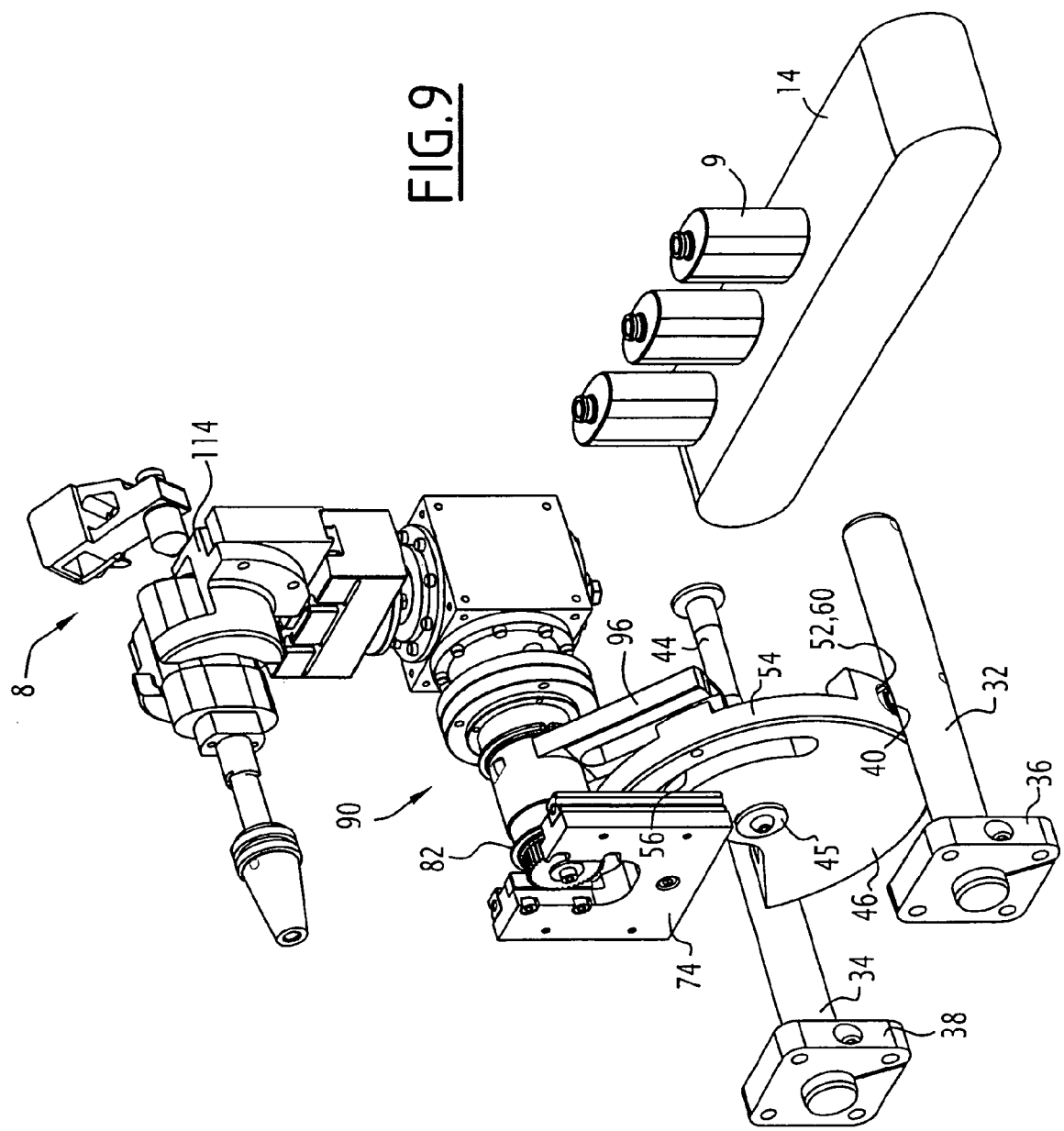
FIG. 9 is a view similar to FIG. 7 in a position during a stage of putting the article into place in a retention and drive assembly of the printing machine.

During a stage 124 of movement in translation, shown in FIG. 9, the moving equipment 17 is moved in translation parallel to the axis A-A' towards the front face 6 of the frame in order to insert the bottom of the article 9 into the socket 10 of the retention and drive assembly 8.

For this purpose, the motor and gearbox unit 42 continues to turn the disk 46. The guide shoe 40 is guided in the branch 62 so that the rotary movement of the disk 46 is transformed into movement of the moving equipment 17 in translation relative to the frame 4 along the cylinder 32.

At the end of the stage 71 and during the stage 124 of movement in translation, since the profile 98 at the end of the crank 96 is concentric on said portion about the axis 45 of the drive disk 46, the arm 20 is no longer driven in rotation.

Once the bottom of the article 9 is in position in the socket 10, the mechanism 110 drives the jaws 107 and 108 so that they move apart, away from the article during a jaw-displacement stage 130.

Finally, the plunger 12 slides so as to hold the article in place, and the retention and drive assembly 8 is moved towards the printing machine.

During the initial terminal rotation 70, intermediate rotation 72, and final terminal rotation stages 71, and during the stage 124 of movement in translation, the jaws 107, 108 do not move relative to the clamp support 104.

In order to return and take another article, the transfer device 15 repeats the above-described displacement stages in the reverse order, i.e. the moving equipment 17 is initially moved in translation away from the frame 4 during a stage 124 of movement in translation.

Thereafter, the manipulator arm 20 pivots about the axis A-A' during the final terminal rotation stage 71, during which the clamp 22 does not turn about its axis of rotation B-B'.

Thereafter, the clamp 22 pivots about the axis B-B' simultaneously with the arm 20 turning about the axis A-A', during the intermediate rotation stage 72.

Finally, in the vicinity of the feed conveyor 14 and to avoid causing an article 9 standing on the conveyor, the clamp 22 stops pivoting about the axis B-B' and the arm 20 finishes turning about the axis A-A', during the initial terminal rotation stage 71.

Finally, the jaws move apart during a stage 130 to take another article 9 placed on the conveyor 14.

Consequently, the motor and gearbox unit 42 and the drive shaft 44 drive both the moving equipment 17 in translation and the arm 20 and the clamp 22 in rotation to perform the entire movement of taking hold of the article 9 on the feed conveyor 14 until the article 9 has been positioned in the socket 10 of the drive and retaining assembly.

The means for synchronizing movement of the manipulator arm 20 and of the clamp 22 prevent the clamp 22 from tilting relative to the arm during the terminal rotation stages 70, 71, i.e. while the arm 20 is close to the retention and drive assembly 8 and while the arm 20 is close to the feed conveyor 14, so as to ensure that the clamp 22 or the article carried thereby does not strike the retention and drive device 8 prior to the article being put into place therein and while the clamp moves away therefrom in order to take hold of another article.

In a particular embodiment, the synchronization means completely prevent the clamp 22 from tilting relative to the arm 20 during the terminal rotation stages 70, 71.

The pivot wheel 58, the shell 88, the crank 96, and the slot 98 in the crank constitute a drive system for driving the manipulator arm 20 and the gripper clamp 22. The drive pinion 82 and the drive shaft 100 constitute a drive system for driving the gripper clamp 22. The drive carriage 74, the cam path 56, and the control wheel 84 constitute a controllable mechanism for modifying the drive imparted by the system for driving the gripper clamp 22. The drive disk 50 constitutes means for providing mechanical coupling between the motor 42 and the controllable mechanism for modifying the drive of the drive system of the gripper clamp 22.

A single drive motor 42 can drive both the manipulator arm 20 and the clamp 22. Nevertheless, the displacement of the arm extends over an angular range that is different from the angular range of the displacement of the clamp 22 and the speed of rotation of the arm is different from the speed of rotation of the clamp 22. For this purpose, mechanical coupling means and a mechanism for modifying the kinematics (i.e. the speed) applied to the clamp are introduced between the clamp 22 and the motor 42.

The mechanism for modifying kinematics is controlled by the speed of the motor 42.

The cam path 56, the carriage 74, and the control wheel 84 constitute means for synchronizing the movements of the arm 20 and of the clamp 22.

Advantageously, the transfer device is suitable for moving the articles at a high rate, while ensuring that the articles do not strike the surface of the feed conveyor or the surface of the retention and drive assembly, and ensuring that the jaws do not strike the article during stages of retrieving an article.

Furthermore, a clamp having jaws that are guided in translation is easier to make than a clamp having hinged jaws.

Furthermore, the use of such a clamp requires a jaw-displacement stroke that extends at least over a few millimeters more than the width of the article to be moved.

In addition, the 90° rotation of the gripper clamp takes place away from the zone where it is close to the feed conveyor and away from the zone where it approaches or moves away from the position in which the article is placed between the socket and the plunger.

The invention claimed is:

1. A printing machine comprising a frame, a transfer device for transferring an article in said printing machine and a drive and retention assembly comprising a socket adapted to receive the bottom of the article, the transfer device being carried by the frame, and the transfer device comprising:

a support structure;

a manipulator arm carried by the support structure and hinged relative to the support structure about a pivot axis;

a clamp for gripping the article carried by the manipulator arm and hinged relative to the manipulator arm about a tilt axis that is angularly offset relative to the pivot axis; and drive means adapted to drive both the manipulator arm and the gripper clamp in rotation during an intermediate rotation stage, wherein the drive means comprises synchronization means for inhibiting tilting of the gripper clamp relative to the manipulator arm about the tilt axis, temporarily as a function of the position of the manipulator arm during at least one terminal rotation stage before and/or after the intermediate rotation stage, and wherein the support structure of the transfer device is mounted to move relative to the frame, and the drive means is adapted to move the support structure relative to the frame in a direction parallel to the pivot axis during a stage of movement in translation, in order to insert the bottom of the article into the socket of the retention and drive assembly.

2. A printing machine according to claim 1, wherein the synchronization means are suitable for stopping the gripper clamp from tilting relative to the manipulator arm during at least one terminal rotation stage before and/or after the intermediate rotation stage.

3. A printing machine according to claim 1, wherein the drive means comprises:

a drive system for driving the manipulator arm and the gripper clamp;

a drive system for driving the gripper clamp;

a single drive motor for driving the drive system for the manipulator arm and the gripper clamp;

a controllable mechanism for modifying the kinematics of the drive system for the gripper clamp; and means for mechanically coupling the drive motor to the controllable mechanism for modifying the kinematics of the gripper clamp.

4. A printing machine according to claim 1, wherein the manipulator arm includes a shell, and the drive means includes a first drive shaft carrying an angle transmission, and a second drive shaft cooperating with said angle transmission, which second drive shaft is fastened securely to the clamp; and a single drive motor suitable for driving both the shell to cause the manipulator arm to pivot about the pivot axis, and the first drive shaft to cause the gripper clamp to tilt about the tilt axis.

5. A printing machine according to claim 1, wherein the drive means are carried by the support structure, and said single drive motor is adapted to drive the manipulator arm and the gripper clamp during the intermediate rotation stage, and to drive only the manipulator arm during the or each terminal rotation stage.

6. A printing machine according to claim 1, wherein the drive means comprises first transmission means for transmitting pivoting movement of the manipulator arm relative to the support structure, and second transmission means for transmitting tilting movement of the gripper clamp relative to the manipulator arm, the second transmission means cooperating with the synchronization means.

7. A printing machine according to claim 6, wherein the first transmission means comprises a drive disk secured to a drive shaft adapted to turn the drive disk, a pivot wheel secured to the drive disk, a crank secured to the manipulator arm and provided with a guide slot extending radially relative to the pivot axis, the guide slot being adapted to co-operate with the pivot wheel to turn the manipulator arm during the terminal rotation stages and during the intermediate rotation stage.

8. A printing machine according to claim 7, wherein the cam path includes at least one middle portion presenting a shape adapted to drive the carriage in translation relative to the support structure and to turn the gripper clamp relative to the manipulator arm during the intermediate rotation stage.

9. A printing machine according to claim 7, wherein the second transmission means includes an angle transmission disposed in the manipulator arm having one end carrying the gripper clamp and having its other end connected to the synchronization means for driving the angle transmission in order to turn the gripper clamp during the terminal rotation stages and the intermediate rotation stage.

10. A printing machine according to claim 9, wherein the synchronization means includes a cam path formed in the drive disk, the cam path including at least one end portion presenting a shape adapted to cause the angle transmission to turn relative to the manipulator arm, and in that the synchronization means include a drive carriage supporting a control wheel slidably received in the or each middle portion to drive the carriage in translation relative to the support structure and to prevent the gripper clamp from turning relative to the manipulator arm during the terminal rotation stage.

11. A printing machine according to claim 1, wherein the gripper clamp comprises:
   a support element;
   two jaws mounted on the support element and movable in translation along an axis perpendicular to the tilt axis; and
   means for moving the jaws in translation in order to take hold of and/or to release the article.

12. A printing machine according to claim 11, wherein the gripper clamp further includes at least two indentations each presenting a specific profile adapted to co-operate with the particular shape of an article and formed in pieces having means for being secured to the jaws.

13. A printing machine according to claim 1, including:
   a transfer device wherein the manipulator arm includes a shell,
   and the drive means includes a first drive shaft carrying an angle transmission, and a second drive shaft cooperating with said angle transmission,
   which second drive shaft is fastened securely to the clamp, and a single drive motor suitable for driving both the shell to cause the manipulator arm to pivot about the pivot axis, and the first drive shaft to cause the gripper clamp to tilt about the tilt axis,
   the printing machine including
   at least one guide cylinder secured to the frame and provided with a guide shoe,
   and the drive means of the transfer device includes third transmission means for transmitting movement in translation of the support structure relative to the frame,
   the third transmission means including a groove formed in the edge face of the drive disk and provided with at least a first segment extending axially relative to the drive shaft,
   the guide shoe being adapted to engage in the first segment of the groove to move the support structure relative to the frame in translation parallel to the pivot axis during the stage of movement in translation.

14. A printing machine according to claim 13, wherein the groove includes a second segment that is circular and concentric with the drive shaft, and the guide shoe is adapted to engage in the second segment of the groove during the terminal rotation stage and the intermediate rotation stage to allow the support structure to be held in position while allowing the manipulator arm to move in rotation.

15. A method of transferring an article between first and second locations in a printing machine according to claim 1, the method comprising the following steps:
   at least one terminal rotation stage during which the manipulator arm is driven in rotation about the pivot axis while the gripper clamp is stationary relative to the tilt axis;
   an intermediate rotation stage during which the manipulator arm is driven in rotation about the pivot axis and the gripper clamp is driven in rotation about the tilt axis; and
   a stage of movement in translation during which the support structure is moved towards and away from the frame in translation parallel to the pivot axis, the manipulator arm is stationary relative to the pivot axis, and the gripper clamp is stationary relative to the tilt axis.

16. A method according to claim 15, including a transfer device, the method including a stage of moving jaws during which the jaws are moved in translation to take hold of or to release the article, and during which the manipulator arm is stationary relative to the pivot axis and the gripper clamp is stationary relative to the tilt axis.

* * * * *